(12) United States Patent
Rivin

(10) Patent No.: US 6,733,393 B2
(45) Date of Patent: May 11, 2004

(54) SPIDER COUPLING

(76) Inventor: Eugeny I. Rivin, 4227 Foxpointe Dr., West Bloomfield, MI (US) 48323

( * ) Notice: Subject to any disclaimer, the term of this patent is extended or adjusted under 35 U.S.C. 154(b) by 33 days.

(21) Appl. No.: 10/108,747

(22) Filed: Mar. 28, 2002

(65) Prior Publication Data

US 2003/0186748 A1 Oct. 2, 2003

(51) Int. Cl.[7] ............................. F16D 3/66
(52) U.S. Cl. ..................... 464/62; 464/73; 464/81
(58) Field of Search ................ 464/73, 81, 62, 464/61, 150, 137, 160, 161, 180, 185

(56) References Cited

U.S. PATENT DOCUMENTS

| | | | | |
|---|---|---|---|---|
| 1,245,695 A | * | 11/1917 | Francke | 464/76 |
| 1,642,907 A | * | 9/1927 | Sundh | 464/65 |
| 1,933,072 A | * | 10/1933 | Ricefield | 464/103 |
| 2,343,839 A | * | 3/1944 | Austin | 464/76 |
| 3,638,454 A | * | 2/1972 | Croset | 464/76 |
| 4,541,816 A | * | 9/1985 | Fickelscher | 464/81 |
| 4,557,703 A | * | 12/1985 | Rivin | 464/73 |
| 4,639,237 A | * | 1/1987 | Fukuda | 464/65 |

* cited by examiner

Primary Examiner—Lynne H. Browne
Assistant Examiner—Kenneth L Thompson

(57) ABSTRACT

A spider shaft coupling transmitting torque via deformable legs of a spider-like flexible element in which the spider is designed as a captive assembly of a holding base (internal or external) and deformable legs comprising thin-walled solid or wound shells.

14 Claims, 2 Drawing Sheets

US 6,733,393 B2

SPIDER COUPLING

FIELD OF THE INVENTION

The invention relates to connecting elements for mechanical transmissions and in particular to shaft couplings.

BACKGROUND OF THE INVENTION

Shaft couplings in which a resilient member is provided between the driving and driven parts (hubs) of the coupling are known and widely used. Since small size and low values of weight and rotary inertia are frequently of critical importance, and since smaller couplings are usually less costly, spider or jaw couplings are quite popular. It is known (e.g., see E. Rivin, "*Design and Application Criteria for Connecting Couplings*", in *ASME Journal of Mechanisms, Transmissions, and Automation in Design*, 1986, Vol. 108, No. 1, pp. 96–105) that the spider couplings have the smallest size and the lowest weight and rotary inertia for a given rated torque. However, they also possess the highest values of torsional stiffness as well as radial stiffness which is important for misalignment compensation (see the quoted paper). Thus, spider couplings of conventional designs provide a poor isolation of torsional vibrations and also poor compensation of forces on bearings of the connected shafts due to inevitable shaft misalignments. In addition, the high stiffness values result in very small damping contribution of the spider coupling to the transmission system, while damping enhancement in the transmission system is often highly desirable. Since spider couplings are usually equipped with elastomeric flexible elements, they cannot be used in high temperature and other aggressive environments, as well as in the environments wherein special non-contamination and sanitary requirements are specified (e.g., in food and cosmetics processing machinery).

Another shortcoming of the conventional spider couplings is relatively fast deterioration of the elastomeric spider due to stress concentrations in the sharp corners of the spider legs, usually having rectangular cross sections.

While the issues of excessive torsional and misalignment compensation stiffness, as well as the issue of stress concentration had been addressed in our U.S. Pat. No. 4,557, 703, the issues of applicability in the extreme environments were not. There are known cases when spiders are fabricated from a material acceptable in the extreme environments, such as bronze, but use of such spiders results in even higher torsional and compensation stiffness values.

The present invention addresses the shortcomings of the conventional spider couplings by providing a coupling which, while maintaining the advantageous small size and small weight characteristics, can be used in aggressive or contamination-sensitive environments, has reduced torsional and compensation stiffness, may possess a significant damping and also may positively influence the damping characteristics of the transmission system wherein the subject coupling is installed.

Some embodiments of the present invention can be retrofitted into existing installations of the spider couplings without replacement of the already installed hubs. There is also a possibility of fine tuning of the coupling characteristics with the same hubs in place.

SUMMARY OF THE INVENTION

This invention is directed to an improved form of connecting coupling for mechanical assemblies, especially for power transmission shafts. Broadly, the invention involves using a spider made from metal or from other rigid material, in which the load-carrying "legs" of the spider are shells of revolution of a tapered, barrel, or cylindrical shape. These shells can be solid or wound from wire in a manner of helical coil springs. These legs are attached by mechanical means to the holding base of the spider (centrally or peripherally situated), while being capable to freely deform under radial loading by tangential forces transmitted by the coupling, as well as under axial loading by forces radial to the coupling and generated due to misalignment of the connected shafts. When even larger deformations are desirable, the shells can be generated by coiling them from wire, like helical coil springs.

Even greater deformations can be achieved if the wire made from a superelastic alloy is used for coiling the shells.

The radially deformable shells of revolution can accommodate large tangential forces in torque-transmitting couplings. Deformations of the shells (thus, torsional stiffness of the coupling) can be adjusted or tuned by varying wall thickness of the deformable shells, with increase of maximum deformation (thinner walls or thinner wire in the wound shells) being accompanied by reduction of the rated torque of the coupling.

The shells are attached to and are held together by the holding base, either a centrally located "central base" to which the shells of revolution are connected as spider legs, or a ring surrounding the coupling to which the shells are connected in a similar way. The latter embodiment allows replacement of the "spider" without a need to disassemble the whole setup, e.g. consisting of a motor driving a hydraulic pump.

The shells are attached to the holding base in such a way that they cannot separate from the base (are "captive"), while having some relative mobility thus allowing free deformation of each loaded shell.

BRIEF DESCRIPTION OF THE DRAWINGS

The present invention can best be understood with reference to the following detailed description and drawings, in which.

DETAILED DESCRIPTION OF THE PREFERRED EMBODIMENTS

Figure 1:
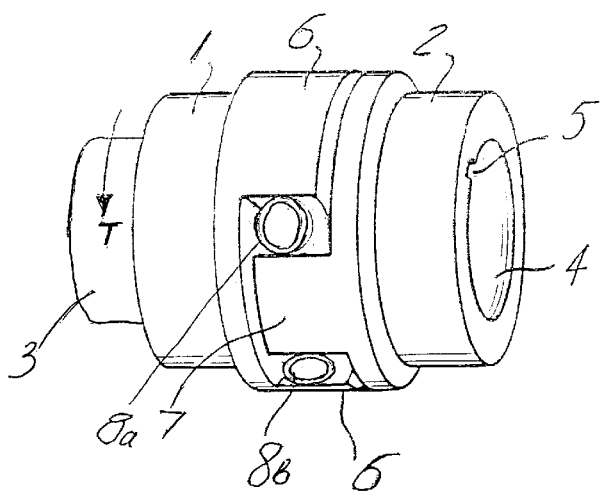
FIG. 1 is an isometric rendering of a shaft spider coupling according to the present invention, showing hubs and a view of the deformable shells of revolution accommodating the transmitted torque.
Figure 2:
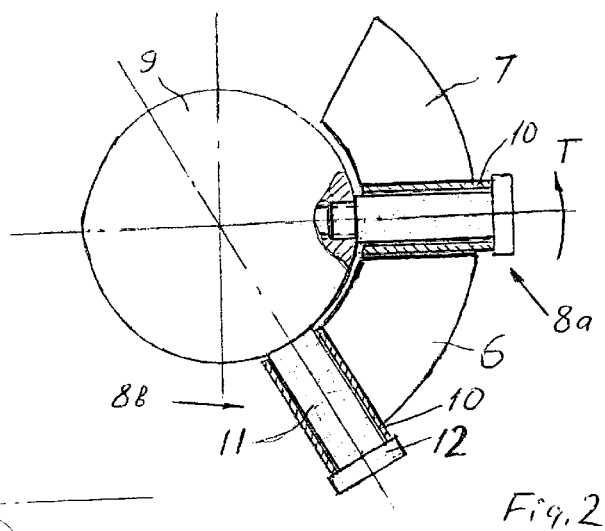
FIG. 2 is a partial cross section of the embodiment having its holding base embodied as a central base, and showing cylindrical deformable shells of revolution as well as their attachment to the central base.

Referring to FIG. 1, 1 and 2 are the driving and driven hubs, respectively (their roles can be reversed). The first connected mechanical member is represented in FIG. 1 by driving shaft 3 attached to driving hub 1. The second connected mechanical member is not shown in FIG. 1 but can be connected to hub 2 via shown hole 4 with keyslot 5 or by other known mechanical means. In most cases, the second mechanical member is the driven shaft engaged with hub 2. While usually both hubs are attached to rotatably supported mechanical members (shafts), one of hubs 1 and 2 can be attached to a stationary mechanical member. Each hub has an equal number of axially extending cams 6, 7 on hubs 1, 2 respectively. The spider partially shown in FIG. 2 is situated between hubs 1 and 2 in such a way that its central base 9 is accommodated in recesses correspondingly provided in the hubs, and each of its radially protruding legs 8 is located between a pair of cams 6, 7, thus the torque is transmitted from the driving shaft and hub 1 to the driven shaft and hub 2 through spider legs 8, which are compressed by the tangential force.

Each leg 8a, 8b of the spider shown in FIGS. 1, 2 comprises cylindrical shell of revolution 10 attached to central base 9 by means of threaded stud 11 having an extended head 12 (not shown in FIG. 1). The role of stud 11 is to locate shell 10 so that it is always positioned between opposing cams 6, 7, and the role of extended head 12 is to prevent separation of shell 10 from stud 11, thus also from central base 9. Obviously, many other known means of attachment shells of revolution 10 to central base 9 can be employed, provided that shells 10 are properly situated in relation to central base 9 and cams 6, 7, and are captive thus cannot get separated from their proper engagement with central base 9.

Figure 3:
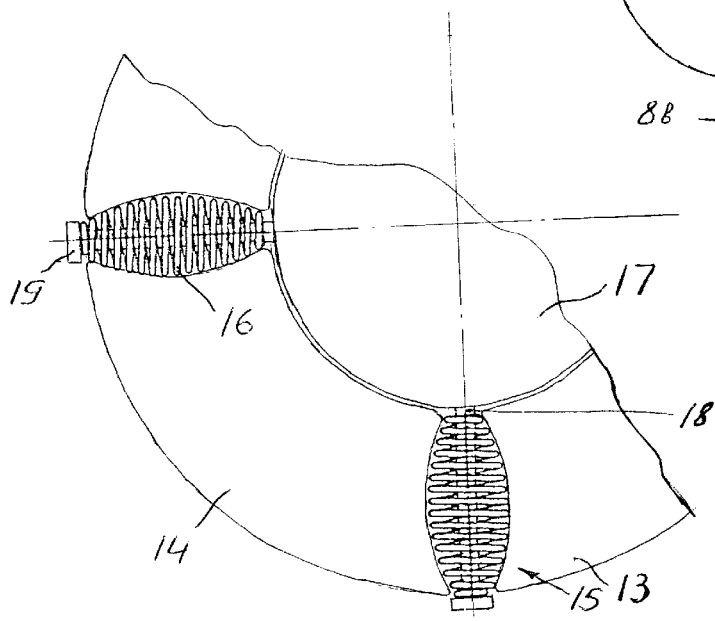
FIG. 3 is a partial cross section of the embodiment having its holding base embodied as a central base, and showing barrel-shaped deformable shells of revolution made by coiling from wire as well as their attachment to the central base.
Figure 4:
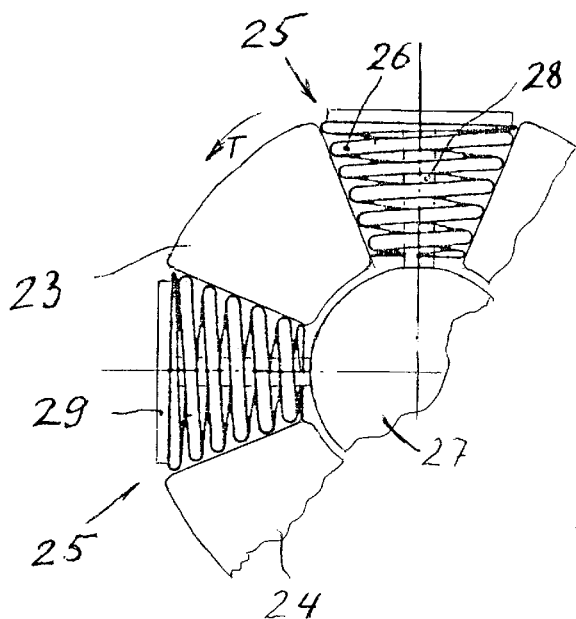
FIG. 4 is a partial cross section of the embodiment having its holding base embodied as a central base, and showing cone-shaped deformable shells of revolution made by coiling from wire as well as their attachment to the central base.
Figure 5:
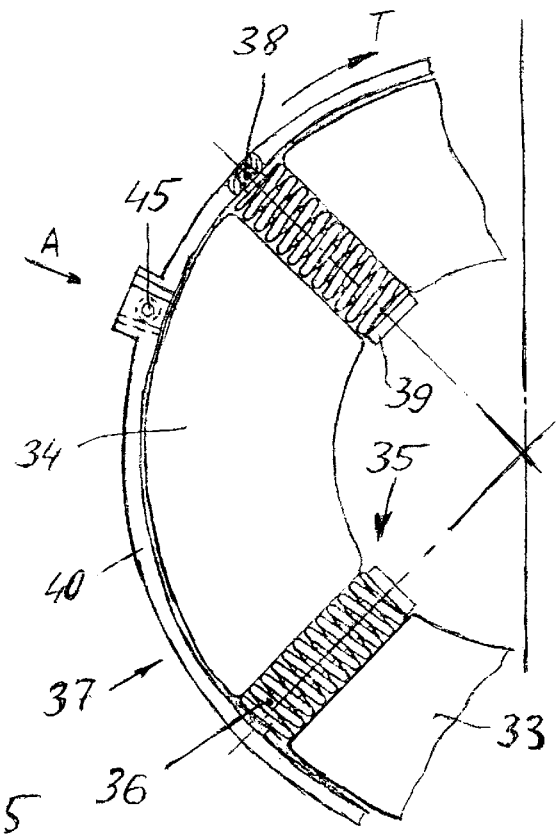
FIG. 5 is a cross section of the embodiment having its holding base embodied as a surrounding ring base, and showing cylindrical deformable shells of revolution as well as their attachment to the ring-shaped holding base and joining of ends of said ring-shaped holding base.

In operation, transmission of torque T from hub 1 to hub 2, as shown by the arrows in FIGS. 1 and 2, leads to compression of leg 8a by the tangential force and loosening of leg 8b, as they are shown in FIG. 1 and FIG. 2. If the spider had more than two legs, but an even total number of legs as is usually the case (spider with six legs is shown in FIG. 2, spiders with four legs are shown in FIGS. 3, 4, 5), then the legs around the circumference of the coupling are alternately compressed and loosened.

Compression of a leg amounts to radial compression of those cylindrical shells of revolution 10 attached to legs 8 which are subjected to compression during torque transmission through the coupling. If shells 10 are made from a metal, e.g. steel, or other strong material (solid hard plastic, e.g. having hardness exceeding H90 by Shore A durometer, fiber-reinforced plastic, etc.), then they can accommodate very significant tangential forces. These forces are comparable or exceeding forces allowable for conventional elastomeric spiders having legs with rectangular cross sections, both due to superior strength of metals or hard plastics, and due to low or absent stress concentrations during radial compression of shells, and high stress concentrations in corners of the compressed elastomeric spider legs.

By making shells 10 with thicker walls, the allowable tangential forces are increasing thus increasing the rated torque of the coupling, but increasing its torsional and misalignment-compensation stiffness. Conversely, shells 10 with thinner walls would result in lower torsional and compensation stiffness, but at the price of a reduced rated torque. Alternatively, stiffness and rated torque of the coupling per the present invention can be varied by selecting material for the shells with appropriate moduli of elasticity and/or allowable stresses/compression deformations.

A special case is using NiTi superelastic alloy for fabricating shells 10. While the ultimate compression deformation of cylindrical steel shells before yielding of the material (e.g., steel) usually does not exceed 1–2%, it was experimentally found that thin-walled cylindrical shells made of the superelastic NiTi alloy allow up to 20% compression before yielding or cracking. It is known, that in addition to the superior elastic limit, superelastic alloys possess significant amounts of damping which is highly desirable in majority of applications of shaft couplings.

FIG. 3 shows a partial cross section of another embodiment of the present invention in which spider legs 15 comprise deformable shells of revolution 16 having barrel-like shape and are attached to central base 17 by studs 18 with extended heads 19; other known mechanical means can also be used for a captive attachment of shells 16 to central base 17. Shells 16 are shown to be wound from wire, but obviously solid thin-walled barrel-shaped shells can be used. The shells are placed between cams 13 (driving), 14 (driven) whose surfaces contacting with shells 16 representing the spider legs are made concave.

Shapes of cams 6, 7 in FIG. 2 and of cams 13, 14 in FIG. 3 represent shapes of cams of two widely used commercially available types of spider or jaw couplings, thus appropriately dimensioned spiders illustrated in FIGS. 2 and 3 can be used for replacing (retrofitting) conventional elastomeric spiders without replacing the hubs.

Shells of revolution 16 in the FIG. 3 embodiment of the present invention are coiled (wound) from wire in the same manner as helical coil springs are fabricated. Since the shells subjected to compression (shells transmitting torque for given direction of rotation) are attached to the contact surfaces of the cams by friction forces, the coiled shells have similar load-deflection characteristics to solid shells with somewhat lower stiffness. On the other hand, strength and elastic properties of thin wires are usually far superior to mechanical properties of solid materials. Ready made (off-the-shelf) coil springs of various shapes are readily available in a significant variety (wire diameters, grades of steel including stainless steel, etc.). Costs and availability of superelastic wires are superior to large diameter solid superelastic bars.

FIG. 4 shows a partial cross section of yet another embodiment of the present invention in which spider legs 25 comprise deformable shells of revolution 26 having cone-like shape and are attached to central base 27 by studs 28 with extended heads 29; other known mechanical means can also be used for a captive attachment of shells 26 to central base 27. Shells 26 are shown to be wound from wire, but obviously solid thin-walled cone-shaped shells can be used. The shells are placed between cams 23 (driving), 24 (driven) having flat contact surfaces.

Deformation of the spider legs in the spider couplings is not uniform along the leg's length. The leg segments at greater radial distance from the rotational axis of the coupling are subjected to greater compression deformation for a given torsional angular deformation of the coupling. In cases of parallelepiped or double-convex legs in conventional spider couplings or cylindrical or barrel-shaped legs in cases of FIGS. 1–3, relative compression of the leg segments located farther from the rotational axis is greater than that of the segments close to the rotational axis. This results in a non-optimal performance since the proximal segments of the legs located close to the rotational axis are underutilized when the compression of the distal segments is at its maximum allowed magnitude. The tapered shape of shells 26 constituting legs 25 in FIG. 4 allows for an optimal use of the material by selecting an optimal conical angle of and shaping the hubs appropriately.

Figure 6:
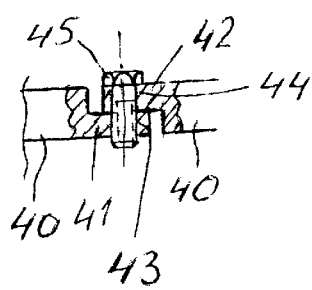
FIG. 6 is an enlarged radial view (by arrow A in FIG. 5) of the end joint of said ring-shaped holding base.

FIG. 5 pictures another embodiment of the shaft coupling per present invention. In the shown partial cross section of the design, external holding base 37 is used, which is designed as a ring carrying spider legs 35. The spider legs are designed similarly to ones in FIGS. 1–4 and comprise deformable shells of revolution 36 (coil spring-like cylindrical shells are shown) supported by internal studs 38 fastened to ring 37 and prevented from separation by heads 39. Ring 37 is designed as a strip 40 to which spider legs 35 are attached. The spider legs can be inserted into spaces between cams 33 and 34 without relative axial shifting of the respective hubs. After assembly, the ends of strip 40 are connected by one of many known techniques. FIGS. 5 and 6 show one of such known techniques wherein both ends 41 and 42 of strip 40 have holes 43 and 44 into which a screw connector 45 is threaded.

While the solid or wire-wound shells of revolution as described above provide for significant deformability resulting in reduced torsional stiffness or increased torsional compliance of the coupling per the present invention, sometimes higher torque rating of the coupling can be required, even at the expense of the increasing torsional stiffness. Such requirement can be easily accommodated in the proposed coupling design by filling the internal space of all or selected shells, or the internal space between the inner walls of the selected shells and the holding studs by a filler material, thus resulting in constraining of compression deformation of the shells. The examples of the filler materials include various blends of rubber, plastics, metal alloys such as low melting point soldering alloys. Use of high damping materials as the fillers can be warranted if increase of damping in the transmission housing the coupling is of importance. The fillers can be injected or inserted into the subject shells.

In applications wherein the coupling must electrically insulate two connected mechanical members (shafts), the deformable shells can be coated with a thin electro-insulating coating, not noticeably changing performance characteristics of the coupling.

It is readily apparent that the components of the spider shaft coupling disclosed herein may take a variety of configurations. Thus, the embodiments and exemplifications shown and described herein are meant for illustrative purposes only and are not intended to limit the scope of the present invention, the true scope of which is limited solely by the claims appended thereto.

What is claimed is:

1. A shaft coupling for connecting the adjacent ends of first and second mechanical members, at least one of which is rotatably supported, comprising:

first and second hubs respectively attached to said two mechanical members, said hubs having axially extending cams with opposed surfaces of said cams creating common openings for insertion of deformable members;

a spider-like coupling element having a holding base and radially extending deformable legs which extend into said common openings to contact the opposed cam surfaces;

each of said deformable legs consisting of an open-ended shell of revolution made from a rigid material and captively attached to said holding base, said deformable legs accommodating torque between said mechanical members by means of radial deformation of said shells of revolution while having mobility relative to said holding base thus being capable to freely deform under external radial loading by tangential forces transmitted by the coupling.

2. A shaft coupling of claim 1, wherein said shells of revolution are shaped as conical shells of revolution whose cross sectional diameters decrease towards the rotational axis of said rotatably supported mechanical member.

3. A shaft coupling of claim 1, wherein said shells of revolution are shaped as barrel-shaped shells of revolution.

4. A shaft coupling of claim 1, wherein said shells of revolution are shaped as cylindrical shells of revolution.

5. A shaft coupling of claim 1, wherein said shells of revolution are made from a metal.

6. A shaft coupling of claim 1, wherein said shells of revolution are made from a superelastic alloy.

7. A shaft coupling of claim 1, wherein said shells of revolution are made from a hard plastic having Shore A hardness above H90.

8. A shaft coupling of claim 1, wherein said shells of revolution are made from a fiber-reinforced composite material.

9. A shaft coupling of claim 1, wherein said shells of revolution are helical coil structures wound from wire.

10. A shaft coupling of claim 1, wherein said holding base is shaped as a central base situated at the center of said shaft coupling and is intersected by the rotational axis of said rotatably supported mechanical member.

11. A shaft coupling of claim 1, wherein said holding base is shaped as a ring surrounding said shaft coupling and is coaxial with the rotational axis of said rotatably supported mechanical member.

12. A shaft coupling of claim 11, wherein said ring is made as a strip whose ends are securely connected during assembly of said shaft coupling thus generating the required ring shape, and easily disconnected during disassembly of said shaft coupling.

13. A shaft coupling of claim 1, wherein internal space of at least some of said shells of revolution is filled with a solid material.

14. A shaft coupling of claim 1, wherein external surfaces of said shells of revolution are coated with an electro-insulating coating.

* * * * *